Figure 1:
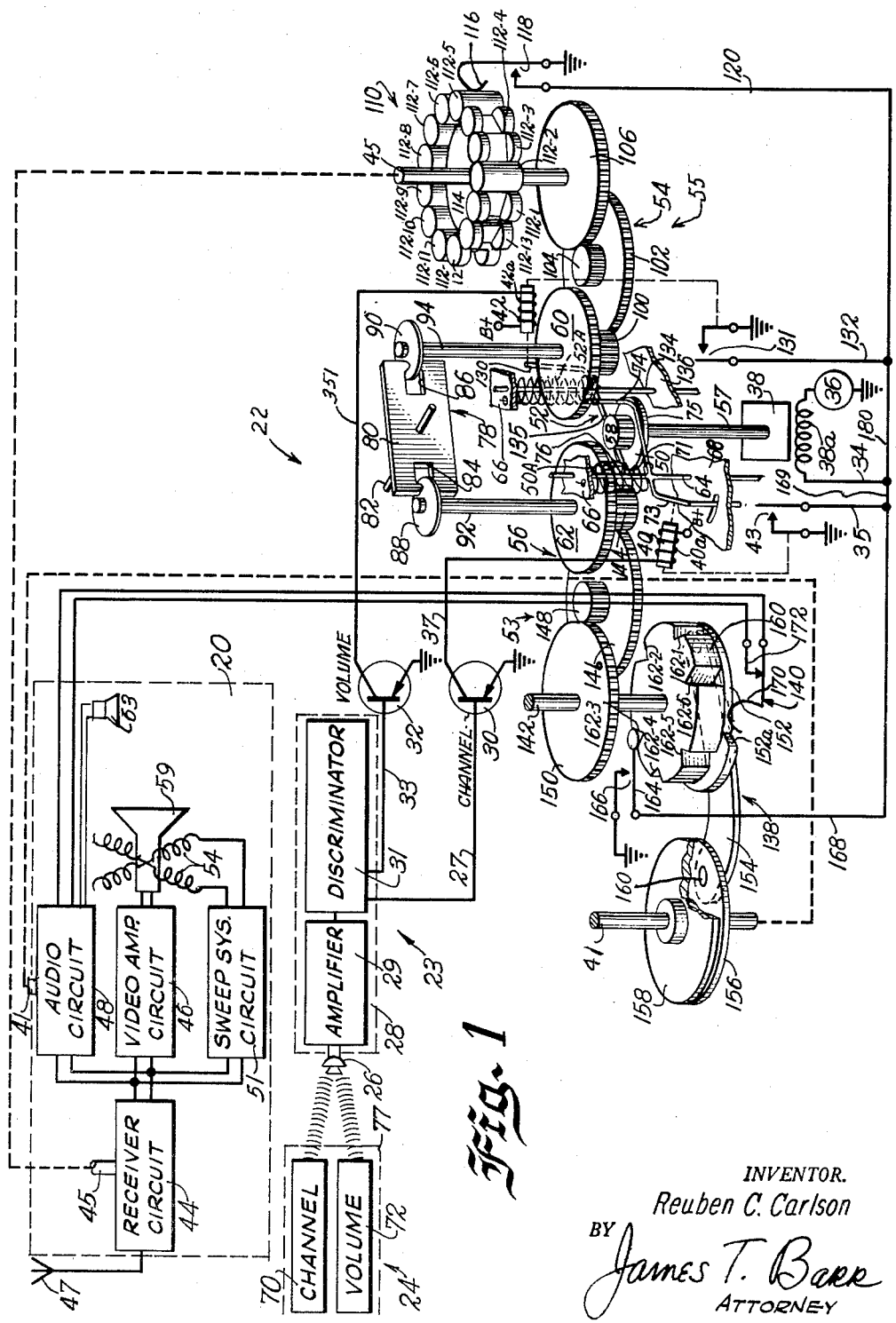

Feb. 18, 1964 R. C. CARLSON 3,121,343
INTERLOCK DRIVE MECHANISM
Filed March 29, 1961 3 Sheets-Sheet 1

INVENTOR.
Reuben C. Carlson
BY James T. Barr
ATTORNEY

Feb. 18, 1964     R. C. CARLSON     3,121,343
INTERLOCK DRIVE MECHANISM
Filed March 29, 1961     3 Sheets-Sheet 3

INVENTOR.
Reuben C. Carlson
BY James T. Barr
ATTORNEY

United States Patent Office 3,121,343
Patented Feb. 18, 1964

3,121,343
INTERLOCK DRIVE MECHANISM
Reuben C. Carlson, Bensenville, Ill., assignor to Admiral Corporation, Chicago, Ill., a corporation of Delaware
Filed Mar. 29, 1961, Ser. No. 99,166
7 Claims. (Cl. 74—472)

The present invention relates to control systems for controlling the operation of electrical circuit means, and more particularly, relates to a new and improved control system operable by energy signals radiated from a remotely positioned transmitter means.

The subject matter of the present invention constitutes an improvement over the subject matter disclosed and claimed in the Reuben C. Carlson application Serial No. 820,468, filed June 15, 1959, now Patent No. 3,075,400, dated June 29, 1963, and assigned to the same assignee as the present application.

The new and improved control system has particular utility in remotely controlling selected ones of the control functions of the wave signal receiving unit. Although the invention is described in connection with a wave signal receiver, it should not be construed as being limited or restricted to this use since the invention has a wide variety of applications in other types of electrical apparatus.

It is an object of the present invention to provide a new and improved control system for remotely controlling an electrical circuit means.

It is another object of the present invention to provide a new and improved control system wherein the operative condition of a selected control function is incrementally adjustable in either a first or a second predetermined manner.

It is a further object of the present invention to provide a new and improved remote control system embodying suitable prime mover means operative in response to the transmission of energy signals to control the movement and direction of rotation of elements associated with particular control functions for electrical circuit means.

It is another object of the present invention to provide in a new and improved remote control system prime mover means adapted to be drivingly coupled to electrical elements in electrical circuit means to change the operative condition of selected ones of the control mechanisms of the electrical circuit means.

It is a further object of the present invention to provide a new and improved remote control system wherein transmitted energy signals are utilized to condition a mechanism for predetermined operation and simultaneously energize a prime mover means to effect operation of the mechanism, thereby to orient a selected control mechanism for performance of a given function.

It is another object, in accordance with the previous object, to use the prime mover means as the motor force to actuate the control mechanism and perform the given function.

The above and other objects are realized in accordance with the present invention by providing for use with electrical circuit means a new and improved remote control system comprising a control system adapted to be actuated by energy signals radiated from a transmitter. The transmitter is of the mobile or portable type and is manually operable to produce a plurality of distinguishable energy signals. In one aspect of the present invention, the control system is responsive to energy signals radiated by the transmitter to change the operative condition of a selected control function of the electrical circuit means in either a first or a second predetermined manner. Since the remote control system has particular application with specific electrical circuit means, e.g., a wave signal receiver, the following pairs of control functions, for example, can be remotely controlled: channel selection and volume, channel selection and fine tuning, channel selection and brightness, channel selection and contrast, volume and fine tuning, brightness and contrast, channel selection and brightness, channel selection and contrast, volume and fine tuning, brightness and contrast, etc.

In another aspect of the present invention, the control system operates in response to energy signals radiated by the transmitter to cause a prime mover to drivingly engage a selected one of the electrical elements in the electrical circuit means for the purpose of changing the operative condition of its associated control function. In a first arrangement wherein the operative condition of a selected control function is adapted to be increased only, the energy signals radiated from the transmitter condition a mechanism for predetermined operation and simultaneously energize a prime mover means to effect the predetermined operation of the mechanism, thereby to change the operative condition of the selected control function. In the above identified Carlson application the control circuit embodies relatively high power vacuum tubes for actuating relatively high power relays to achieve the desired results. In contrast, the control system of the present invention embodies relatively low power transistorized circuits which are incapable of actuating relatively high power relays to perform the desired functions. Hence, the prime mover means itself, in conjunction with the low power devices, is used to obtain the necessary operation of the above mechanism.

In a further aspect of the present invention, there is provided a rocker assembly which is operated by the prime mover to establish a driving connection between the prime mover means and selected ones of the electrical elements of the selected control functions.

Figure 2:
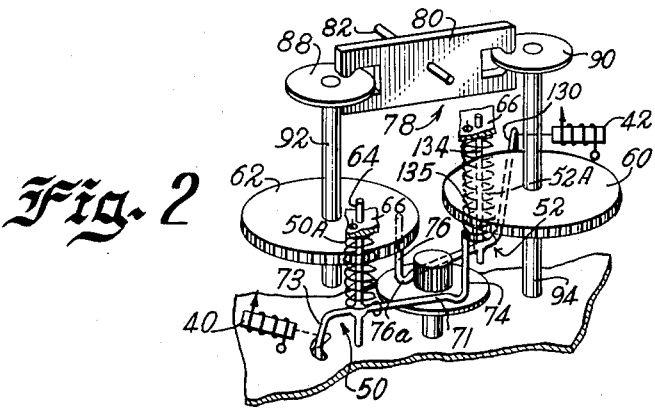
Figure 3:
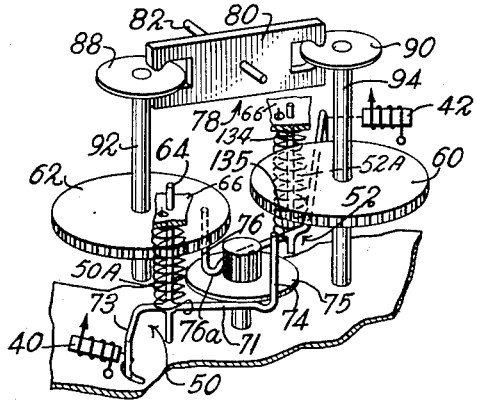
Figure 4:
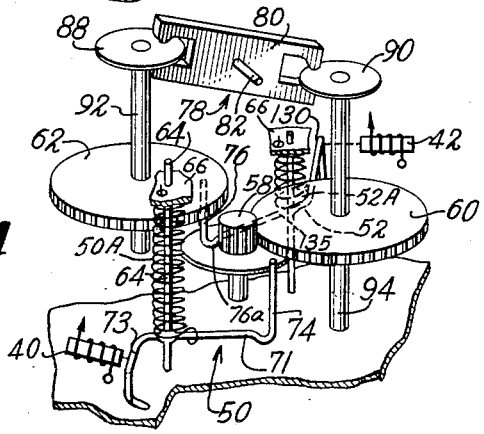
Figure 5:
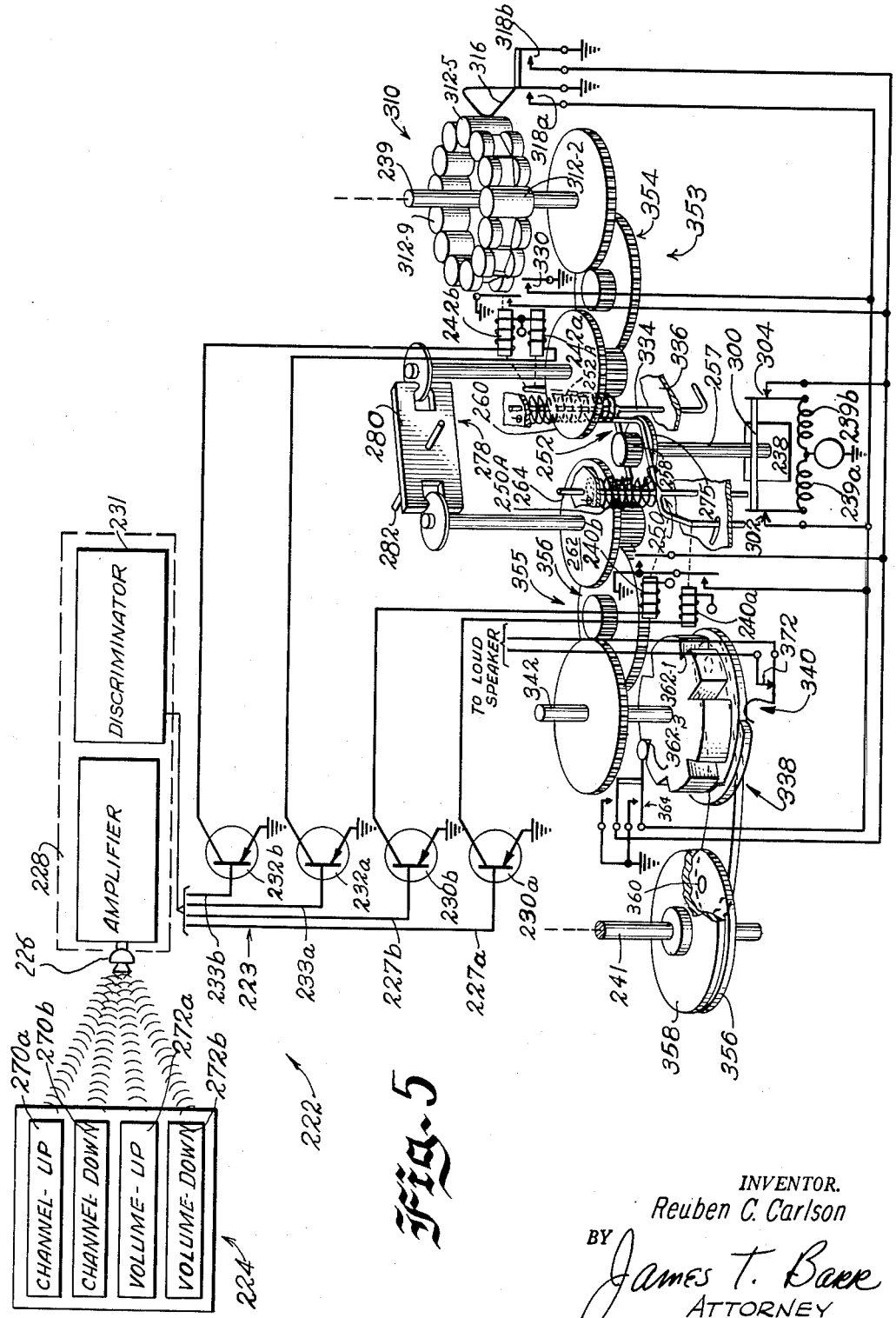

The invention, both as to its essential elements and its method of operation, as well as certain further objects and advantages thereof, will best be understood by reference to the following description taken in connection with the accompanying drawings, in which:

FIG. 1 is a diagrammatic view of a first embodiment of the remote control system embodying the principles of the present invention;

FIGS. 2, 3, and 4 are fragmentary diagrammatic views of portions of the control system of FIG. 1, illustrating different operative conditions; and FIG. 5 is a diagrammatic view of a second embodiment of the remote control system in FIG. 1.

Referring now to the drawings, a first embodiment of the remote control system embodying the features of the present invention is illustrated diagrammatically in FIG. 1 and, may be hereafter identified as a two-button system, while a second embodiment of the remote control system embodying the features of the present invention is illustrated diagrammatically in FIG. 5 and may be referred to as a four-button system. Each of the remote control systems is used to control the operation of electrical circuit means, for example, a wave signal receiver, i.e., a television receiver and comprises a portable transmitter adapted to generate energy signals, hereinafter called ultra-sonic signals, means for detecting these signals, and means responsive to the detected signals. The control system is adapted to change the operative condition of a selected one of a plurality of control functions of the television receiver. For illustrative purposes, two control functions of the television receiver are illustrated as being controlled by the control system, one of the control functions being channel selection and the other being volume. It should be understood that more than two control functions can be controlled by the system of the present invention and, further, that control functions other than channel selection and volume can be remotely controlled by the system of the present invention.

Considering now briefly the FIG. 1, two-button embodiment, a conventional television receiver 20 is illustrated in block form as an example of a type of electrical circuit means that can be controlled by a remote control system 22 comprising control circuits 23 actuable by a remotely positioned transmitter 24. As is well known, the television receiver has many control functions, for example, on-off, volume, fine tuning, brightness, contrast, and channel selection and, in this connection, includes manually adjustable electrical elements respectively associated with these control functions. Particularly, with respect to the volume and channel selection control functions, the associated electrical elements comprise a resistive potentiometer including a rotatable shaft and a tuner including a main tuning shaft, respectively.

The transmitter 24, per se, is a conventional acoustical transmitter which is manually operable to develop two distinguishable energy signals of predetermined magnitude and frequency. The ultra-sonic signals are individually radiated from the transmitter 24 for detection by the control circuits 23 which are preferably located adjacent to the television receiver 20. In fact, the control circuits 23 are actually supported from the chassis of the television receiver 20 so that they are enclosed within the receiver cabinet out of view of an observer.

Briefly, the control circuits 23 comprise an input circuit including a microphone 26 for converting the ultra-sonic signals into electrical signals having frequencies generally corresponding to the frequencies of the ultra-sonic signals. The electrical signals are coupled to a two-frequency selective amplifier network 28 including an amplifier circuit 29 and a discriminator circuit 31. In response to the transmission of a first ultra-sonic signal, the discriminator circuit 31 causes a conductor 27 to be energized to effect the conduction of a channel transistor 30. As a result, a relay 40 is energized and a driving connection is obtained between a prime mover 38 and a main tuning shaft 45, with the result that the operative condition of the main tuning shaft 45 is changed.

In response to the transmission of a second ultra-sonic signal, the discriminator circuit 31 causes a conductor 33 to be energized to effect the conduction of a volume transistor 32. The conduction of the volume transistor 32 causes the energization of a volume relay 42, whereby a driving connection is obtained between the prime mover 38 and a volume potentiometer shaft 41. Accordingly, the operative condition of the potentiometer shaft 41 and the sound level of the receiver 20 is changed. It will thus be appreciated that by successive transmission of either the first or second ultra-sonic signals, the sound level of the receiver can be incrementally increased or the receiver can be tuned to successively higher stations.

Considering now in greater detail the television receiver 20, it includes an antenna 47 coupled to a receiver circuit 44 comprising the usual radio-frequency amplifier section, a station selector section including the above-referred to main tuning shaft 45 and a fine tuning arrangement, a first detector section, an intermediate frequency-amplifier section, and a second detector section. As shown, the output of the receiver circuits 44, i.e., the output of the second detector section, is coupled to a video amplifier circuit 46, an audio circuit 48 including the volume potentiometer shaft 41, and a sweep system circuit 51. The output of the video amplifier circuit 46 is coupled to an electron gun embodied in a cathode ray tube 59, while the output of the sweep system circuit 51 is coupled to a deflection yoke, illustrated schematically by coils 54. The output of the audio circuit 48 is coupled directly to a conventional loudspeaker 63, the sound level of which is controlled by adjustment of the potentiometer shaft 41. Since the construction and operation of the television receiver 20 is well known and comprises no part of the present invention, a description of its operation is not included herein.

The construction and operation of the FIG. 1, two-button remote control system will now be described in detail. The transmitter 24, as suggested above, is of the acoustic resonator type and comprises two resonator rods individually identified as a channel rod 70 and a volume rod 72, which are respectively supported in a casing 77. Each of the resonator rods 70 and 72 is adapted to be shock-excited by a suitable manually-operable hammer or the like (not shown) to produce an ultra-sonic signal having a frequency corresponding to the length and/or configuration of the rod. In a transmitter 24 used with a control system constructed in accordance with the principles of the present invention, the frequencies of the ultra-sonic signals radiated by the resonator rods 70 and 72 are 38.285 mc. and 40.805 kc. In response to repeated striking of the rods 70 or 72, the receiver can be tuned to a desired channel and set at a desired sound level.

Each of the ultra-sonic signals radiated by the resonator rods 70 and 72 is detected by the microphone 26 embodied in the input circuit of the control circuits 23. The mechanical energy of the ultra-sonic signals are effectively converted into electrical signals having the same frequencies as the ultra-sonic signals, i.e., 38,285 kc. and 40.805 kc. The A.C. electrical signals are coupled to the selective network 28 and, particularly, to the amplifier 29 which amplifies the signals developed by the microphone 26. The amplified electrical signals are fed into the discriminator 31 which causes a D.C. pulse to be supplied to the conductor 27 in response to the first electrical signal and a D.C. pulse to be supplied to the conductor 33 in response to the second electrical signal. The conductors 27 and 33 are respectively connected in the base-emitter circuits of the channel transistor 30 and volume transistor 32. As shown, the emitters of the transistors 30 and 32 are connected respectively to control windings 40a and 42a of the channel relay 40 and the volume relay 42. Thus, in response to the transmission of either the first or second ultra-sonic signals, the associated transistor 30 or 32 is rendered conductive so that either the channel relay 40 or volume relay 42 is operated.

Briefly, the channel relay 40 by simultaneously energizing a motor 38 and an actuator 50 establishes driving connection 55 between the motor 38 and the channel selector shaft 45 through gear train 54 and, also, renders gear train 56 ineffective, while the volume relay 42 by simultaneously energizing a motor 38 and an actuator 52 establishes a driving connection 53 between the motor 38 and the potentiometer shaft 41 through a gear train 56 and, also, renders gear train 54 ineffective. The prime mover 38 embodies a drive shaft 57 which rotates in a predetermined direction and, in addition, moves axially incident to its energization. The axially movable shaft 57 coacts with either of the actuators 50 or 52 to effect a driving connection between a drive pinion 58 and either one of the input gears 60 or 62 of the gear trains 54 and 56.

Assuming it is desired to change the station to which the receiver 20 is tuned, the channel resonator rod 70 is actuated to radiate a first ultra-sonic signal. As described above, the channel transistor 30 is rendered conductive to complete an energizing circuit for the channel relay 40, as follows: ground, transistor 30, conductor 37, control winding 40a, and B-plus. The channel relay 40 performs the following two functions: First, it moves the actuator 50 into an inoperative position to condition the driving connection 55 for operation. The actuator 50 is normally spring biased into the position shown by a dual acting coil spring 50A and comprises a vertical portion 64 rotatably and slidably supported from frame members 66, 68 and a horizontal body 71 having an armature end 73. It should be noted that coil spring 50A fits over vertical member 64 with one end of spring 50A secured to horizontal body 71 and the other end secured to frame member 66. Spring 50A is mounted such that body 71 is urged (due to the torsional force exerted by spring 50A) toward drive collar 57, and horizontal body 71 is urged (due to longitudinal force exerted by spring 50A) away from frame member 66. In response to energization of the relay 40, the armature end 73 is attracted to the relay winding thereby causing the vertical portion 64 to rotate clockwise as viewed from the top of FIG. 1 and the horizontal body 71 to move away from the drive shaft 57, i.e., from the position shown in FIG. 2 into the position shown in FIG. 3. As a result, a tip 74 extending vertically upward from the end of the body 71 is moved out of the path of a drive collar 75 located at the end of the motor drive shaft 57 beneath the motor drive pinion 58. Second, the relay 40 closes contacts 43 to complete an energizing circuit for the motor 38, as follows: ground, contacts 43, conductor 35, conductor 169, conductor 34, motor control winding 38a, A.C. source 36, and ground. Incident to energization of the motor 38, its drive shaft 57 simultaneously rotates in a predetermined direction, for example, counterclockwise as viewed from the top of FIG. 1, and moves axially upward, as seen in FIG. 1.

It will be appreciated that the primary function of the drive collar 75 is to effect a driving connection between the drive pinion 58 and either one of the gear trains 54 or 56 by driving either of the tips 74 or 76 upwardly against the longitudinal resistance of springs 50A or 52A respectively into engagement with either of the opposite input gears 62 or 60 of the respective gear trains 56 or 54. To this end, there is provided a rocker assembly 78 which performs the identical function as the rocker assembly disclosed in the above identified Carlson application, Serial No. 820,468. However, in contrast to the latter rocker assembly which is actuated by high-power relays, the rocker assembly 78 is actuated by the drive collar 75 and one of the actuators 50 or 52. In any event, the rocker assembly 78 mechanically interconnects the input gears 60 and 62 and causes one of the gears to move in a direction opposite to that of the other gear when the latter gear is engaged by one of the actuators 50 or 52.

Briefly, the assembly 78 comprises a generally rectangular rocker plate 80 that is pivotally mounted on a suitably supported pivot pin 82 for movement between its two operative positions, illustrated in FIGS. 2 and 4. The rocker plate 80 mechanically interconnects the input gears 60 and 62 by a spindle and disc arrangement and, to this end, the vertical edges of the rocker plate 80 are slotted to produce openings 84 and 86 which are configured to provide bearing surfaces for respectively accommodating discs 88 and 90. These discs 88 and 90 are fixedly secured to movable spindles 92 and 94 that are journaled in suitable supporting means to permit both axial and rotary movement. As shown, the lower ends of the spindles 92 and 94 are fixedly secured to the vertically movable input gears 60 and 62 of the gear trains 54 and 56 such that when one gear moves upwardly the other moves downwardly.

Returning to the operation of the drive collar 75 as it moves upwardly in response to energization of channel relay 40, it may be assumed that the rocker assembly 78 is in the position illustrated in FIG. 1 so that the input gear 62 is in its downward position while the input gear 60 is in its upward position. Now, with the actuator 50 in its inoperative position, the upwardly moving drive collar 75 engages the actuator 52 which actuates the rocker assembly 78. The actuator 52 is constructed identically to actuator 50 and embodies a rotatably mounted vertical portion 134 and a horizontal body 135 having a tip 76 and an armature end 130 cooperatively associated with the volume relay 42. Similar to actuator 50, the actuator 52 is spring biased by a dual acting coil spring 52A so that its tip 76 is disposed in the path of the drive collar 75. In addition, spring 52A urges horizontal body 135 away from frame 66. Thus, the drive collar 75 actually engages the bottom of the tip 76 to drive the tip 76 against the under surface of the input gear 62, as shown in FIG. 3. Actually, because the vertical portion 134 is slidably mounted in the frame members 136, the entire actuator 52 moves upwardly against the action of spring 52A. In any event, the tip 76 under the control of the drive collar 75 moves the input gear 62 from its downward position, shown in FIG. 3, into its upward position, shown in FIG. 4, whereby the rocker assembly 78, via its spindle and disc arrangement 88, 92, its rocker plate 80 and its spindle and disc arrangement 90—94, causes the input gear 60 to move downwardly from its position shown in FIG. 3 into its position shown in FIG. 4. As a result, the upwardly moving drive pinion 58 drivingly engages the downwardly moving input gear 60, thereby to effect a driving connection between the motor 38 and the channel selector shaft 45 in the receiver 20, as follows: the motor drive shaft 57, the drive pinion 58, the input spur gear 60, a follower spur gear 100, a large spur gear 102, a follower spur gear 104, and a spur gear 106 suitably secured to the channel selector shaft 45. Inasmuch as the motor drive shaft 57 rotates in a counterclockwise direction, the channel selector shaft 45 rotates in a clockwise direction.

The channel selector shaft 45 is actually rotated under the control of a tuner programming mechanism 110 which is identical to the programming mechanism disclosed in the above identified Carlson application, Serial No. 820,-468. Similar to the latter mechanism, the programming mechanism 110 functions to move the channel selector shaft 45 directly to an adjacent channel position by completing a holding circuit for the motor 38. It comprises 13 cam buttons 112 mounted on a wheel 114 fixedly secured to the shaft 45, the cam buttons 112 coacting with a cam follower 116 which controls contacts 118 located in a holding circuit for the motor 38. The cam buttons are referred to collectively as 112 and individually as 112–1 through 112–13, the buttons 112–1 through 112–13 corresponding to channels 1 through 13. In the Chicago area, for example, channels 2, 5, 7, 9, and 11 are used and, hence, the buttons 112–2, 112–5, 112–7, 112–9, and 112–11 have outwardly extending cylindrical camming portions to move the cam follower 116 radially outwardly to effect the opening of the contacts 118, while the buttons 112–1, 112–3, 112–4, 112–6, 112–8, 112–10, 112–12, and 112–13 are flattened to permit the cam follower 118 to move radially inwardly to effect the closure of the contacts 118. It may be assumed that prior to transmission of the first ultra-sonic signal, the television receiver 20 is tuned to channel 5 so that the tuner programming arrangement 110 is in the position shown in FIG. 1 wherein the contacts 118 are maintained in an open position by the cam follower 116.

Hence, with the driving connection 55 established, the channel selector shaft 45 rotates in a clockwise direction, with the result that the button 112–5 moves in a clockwise direction out of engagement with the cam follower 116. The cam follower 116, being inherently resiliently-biased toward the cam buttons 112, moves into engagement with the flattened portion of the button 112–6, thereby to close the contacts 118. The closure of the contacts 118 completes a holding circuit for the motor control winding 38a, as follows: ground, follower contacts 118, conductors 120, 180, and 34, motor control winding 38a, A.C. source 36, and ground. Accordingly, the above described holding circuit energizes the motor control winding 38a independently of the above described energizing circuit controlled by the relay 40 and its associated contacts 43. Some time after the holding circuit is completed, the transmission of the first ultra-sonic signal is ended, whereby the channel relay 40 is de-energized with the following results: First, the actuator 50 (or, more particularly, its armature end 73) is released so that its horizontal portion 71 is moved under the control of spring 50A from its inoperative position shown in FIG. 4 toward its operative position shown in FIG. 2. However, the actuator 50 is prevented from moving immediately back to its operative position by the engagement of its tip 74 with the periphery of the drive collar 75. Hence, the drive collar 75 performs the additional function of preventing the tip 76 from interfering with the driving connection between the drive pinion 58 and the input gear 60 or with the downward movement of the drive collar 75 which occurs when the motor 38 is de-energized. Second, the contacts 43 are opened, but, since the above described holding circuit is completed under the control of the tuner programming arrangement 110, the motor control winding 38a remains energized and the motor 38 continues to drive the main tuning shaft 45. Accordingly, the channel selector shaft 45 and associated cam wheel 114 continue to rotate until the cam button 112–7 moves into engagement with the cam follower 116, whereby the cam follower 116 is cammed radially outwardly to open the contacts 118. The opening of the contacts 118 opens the holding circuit for the motor control winding 38a and causes the de-energization of the motor 38. Thus, the motor 38 is de-energized under the control of the tuner programming arrangement 110 to arrest the shaft 45 in its channel 7 position. When the motor 38 is de-energized, the drive pinion 58 moves axially downward into its inoperative position to break the driving connection 53 between the motor 38 and shaft 45. As the drive collar 75 moves downwardly, the actuator 52 is permitted to also move downwardly into its operative position shown in FIG. 2 under the control of spring 52A. In addition, the periphery of the drive collar slides down along the tip 74 thereby holding the tip 74 in its intermediate position. When the drive collar 75 moves beneath the tip 74 the actuator 50 moves under the control of spring 50A into its operative position shown in FIG. 2, wherein its tip 74 is again in the path of the drive collar 75.

If it is desired to tune a television receiver to channel 9 when the receiver is tuned to channel 7, the transmitter 24 is operated to cause the channel resonator rod 70 to transmit another ultra-sonic signal. This ultra-sonic signal causes the channel relay 40 to operate, thereby displacing the actuator 50 into its inoperative position and closing its associated contacts 43 for the purpose of completing the above described energizing circuit for the motor control winding 38a. Incident to operation of the motor 38, the drive pinion 58 moves upwardly and since the actuator 50 is displaced into its inoperative position, the drive pinion 58 engages the actuator 52 and moves it upwardly into the position shown in FIG. 4. However, since the input gears 60 and 62 are in the position shown in FIG. 4, the actuator 52 does not effect a change in the position of the input gears 60 and 62 but merely coacts with the input gear 62 to assure that a driving connection is made between the drive pinion 58 and the input gear 60. Accordingly, the drive pinion again drivingly engages the gear train 54 to cause the channel selector shaft 45 to rotate in a clockwise direction. The clockwise rotation causes the cam button 112–7 to move out of engagement with the cam follower 116, whereby the resilient cam follower 116 moves into engagement with the flattened part of the button 112–8 to effect the closure of the contacts 118. As previously described, the closure of the contacts 118 completes the holding circuit for the motor control winding 38a. While the cam follower 116 engages the cam button 112–8, the transmission of the first ultra-sonic signal is stopped and the relay 40 is de-energized, with the result that the spring biased actuator 50 engages the periphery of the drive collar 75 and, in addition, the control contacts 43 are opened to open the energizing circuit for the motor control winding 38a. However, since the holding circuit remains closed under the control of the tuner programming arrangement 110, the motor 38 remains energized. When the cam button 112–9 moves into engagement with the cam follower 116, the cam follower 116 moves radially outwardly to open the contacts 118 and thereby open the holding circuit for the motor control winding 38a. The motor 38 is thus de-energized, the drive collar 75 moves downwardly, the actuator returns to its operative position in the path of the drive collar 75, and the shaft 45 is stopped in its channel 9 position.

If it is desired to change the sound level of the receiver after it has been tuned to a different channel, the transmitter 24 is operated to cause the volume resonator rod 72 to radiate an ultra-sonic signal. This signal is converted by the microphone 26 into an electrical signal which is fed to the amplifier 29 and then the discriminator 31. It causes a DC pulse to be supplied to the conductor 33, thereby to render the volume transistor 32 conductive to complete an energizing circuit for the volume relay 42, as follows: ground, transistor 32, conductor 35l, relay winding 42a, and B-plus. The operation of the relay 42, similar to the relay 40, performs two functions. First, it moves the actuator 52 into its inoperative position (not shown) to condition the driving connection 53 for operation, the inoperative position (not shown) of the actuator 52 relative to the drive shaft 57 and drive collar 75 being generally similar to the inoperative position of the actuator 50 as shown in FIGS. 3 and 4. More specifically, the armature end 130 of the actuator 52 is attracted to the relay 42 to cause the actuator's body 135 to move horizontally, with the result that vertical portion 134, which is rotatably and slidably supported from frame members 136, rotates in a generally clockwise direction, as viewed from the top of FIG. 1. As a result, the actuator tip 76 moves out of the path of the drive collar 75 so as not to be engageable by the drive collar 75 when the drive shaft 57 moves upwardly. Second, the relay 42 closes contacts 131 to complete an energizing circuit for the motor 38, as follows: ground, contacts 131, conductor 132, conductor 180, conductor 34, motor control winding 38a, A.C. source 36, and ground. Incident to energization of the motor 38, the drive shaft 57 simultaneously moves axially upward and rotates in a counterclockwise direction.

Consequently, the drive collar 75 moves upwardly from its position shown in FIGS. 1 and 2 to its position shown in FIG. 4 to engage the bottom of the tip 74, thereby to drive it against the undersurface of the input gear 60. Similar to actuator 52, the entire actuator 50 moves upwardly against the action of spring 50A. In any event, the input gear 60 is displaced upwardly to actuate the rocker assembly 78 and cause the downward movement of the input gear 62 by the previously described disc and spindle arrangement 90—94, the plate 80, and the disc and spindle arrangement 88—92. Hence, the downwardly moving input gear 62 drivingly engages the upwardly moving drive pinion 58, whereby a driving connection is obtained between the motor shaft 57 and the input gear 62. Actually, the driving connection 53 is completed and the volume potentiometer shaft 41 is driven by the motor 38, as follows: drive pinion 58, input gear 62, small idler gear 144, spur gear 146, follower gear 148, spur gear 150 suitably secured to the idler shaft 142, camming wheel 152, link arm 154, a friction disc 156, and clutch plate 158 which is fixedly secured to the volume potentiometer shaft 41. It will be appreciated that the driving connection 53 includes a crank mechanism 138 which is identical to the crank mechanism disclosed in a co-pending application, Serial Number 100,282, filed April 3, 1961, and which functions to rotate the volume potentiometer shaft 41 forward 120° and backward 120° for every 360° rotation of the idler shaft 142. Similar to the channel selector shaft 45, the volume potentiometer shaft 41 is driven under the control of the volume programming arrangement 140 to assure that the volume is changed by definite incremental amounts. The programming arrangement 140 is identical to the volume programming arrangement disclosed in the co-pending application, Serial Number 100,282, filed April 3, 1961, and performs the same function of completing a holding circuit for the motor 38. Briefly, the volume programming arrangement 140 includes a cam 160 having a plurality of peripheral recesses 162 which perform the same function as the cam buttons 112, the peripheral recesess 162 coacting with a cam follower 164 that controls contacts 166 in the motor holding circuit. It will be noted that the peripheral recesses 162–1 through 162–6 correspond to the operative positions of the potentiometer shaft 41, as follows: off, mute, low, medium-low, medium, and high. With the motor 38 operated under the control of its energizing circuit, the idler shaft 142 rotates in a clockwise direction to cause the cam disc 160 to move also in a clockwise direction, with the result that the cam follower 164 is cammed out of the peripheral recess 162–3 onto the periphery of the cam 160. In this latter position, the cam follower 164 moves radially outwardly to effect the closure of the contacts 166. The closure of the contacts complete a holding circuit for the motor control winding 38a as follows: ground, contacts 166, conductors 168, 169, and 34, motor control winding 38a, A.C. source 36, and ground. Accordingly, the above described holding circuit energizes the motor control winding 38a independently of the above described energizing circuit controlled by the relay 42 and its associated contacts 131. Some time after the holding circuit is completed, the transmission of the ultra sonic signal is ended, whereby the volume relay 42 is de-energized with the following results: First, the actuator 52 is released, whereupon its tip 76 moves under control of spring 52A into engagement with the periphery of the drive collar 75. Second, the contacts 131 are opened, but, since the above described holding circuit is completed under the control of the volume programming arrangement 140, the motor control winding 38a, remains energized and the motor 38 continues to drive the volume potentiometer shaft 41.

In order to turn off the sound during movement of the volume potentiometer shaft 41 from its high position to its mute position, a second camming wheel 152 is provided. As shown, it embodies an offset peripheral camming surface 152a for coacting with a suitable cam follower 170 associated with a pair of contacts 172 located within the voice coil circuit of the loudspeaker 63. Specifically, as soon as the idler shaft 142 commences its clockwise rotation from recessed position 162–6, the cam follower 170, which is resiliently urged radially inwardly of the cam wheel 152, moves onto the camming surface 152a, with the result that the contacts 172 are opened and the circuit to the voice coil of the loudspeaker 63 is opened.

Thus, the clockwise movement of the idler shaft 142 continues until the cam follower 164, which is spring biased inwardly of the cam 160, falls into the peripheral recess 162–1, whereby the contacts 166 are opened. The opening of the contacts 166 opens the holding circuit for the motor control winding 38a and causes the de-energization of the motor 38. Thus, the motor 38 is de-energized and the drive pinion 58 moves axially downward to break the driving connection 53 between the motor 38 and the volume potentiometer shaft 41. As a result of the drive collar 75 moving downwardly, the actuator 50 moves downwardly under the control of spring 50A to its operative position shown in FIG. 2. At the same time the periphery of the drive collar 75 slides down the tip 76 of the actuator 52 and, when the collar 75 passes beneath the actuator tip 76, the actuator 52 moves back under the control of spring 52A into its operative position shown in FIG. 2 wherein its tip 76 is again in the path of the drive collar 75. By the above described operation, the volume potentiometer shaft 41 is stopped in its off position and the receiver 20 is turned off.

Referring now to the FIG. 5, 4-button embodiment of the present invention, a remote control system is generally identified by reference number 222. In the interest of simplifying the description and understanding of the drawings, elements of the FIG. 5 embodiment which correspond to elements in the FIG. 1 embodiment are identified with reference numerals which are 200 higher than the reference numerals in the FIG. 1 embodiment.

The remote control system 222, similar to the above described remote control system 22, includes a portable transmitter 224 adapted to transmit ultrasonic signals to the control circuits 223 associated with a television receiver 20. The transmitter 224 is similar in construction and operation to the previously described transmitter 24, with the exception that it functions to radiate four ultra-sonic signals instead of two ultra-sonic signals, the four ultra-sonic signals having the following frequencies: 38.285 kc., 39.285 kc., 40.805 kc. and 41.805 kc. The control circuits 223 include a microphone 226 which converts the ultra-sonic signals into electrical signals, as described above. The electrical signals are fed into a four-frequency selective amplifier network 228, similar in construction and operation to the above described amplifier network 28. In response to the transmission of the first, second, third, and fourth ultra-sonic signals, the amplifier network 228 causes conductors 227a, 227b, 233a, and 233b, respectively, to be energized with D.C. pulses. The conductors 227a, 227b, 233a, and 233b are respectively connected to the bases of the channel-up transistor 230a, channel-down transistor 230b, volume-up transistor 232a and volume-down transistor 232b. Each of the transistors include collector emitter circuits in which are included the channel-up relay 240a, channel-down relay 240b, volume-up relay 242a, and volume-down relay 242b, respectively. The relays 240a, 240b, 242a, and 242b function similarly to the previously described relays 40 and 42 to simultaneously operate a prime mover 238 and either one of the actuators 250 or 252. Similar to the FIG. 1 embodiment, repetitive transmission of one of the four ultra-sonic signals successively changes the operative condition of either the channel or volume control function of the television receiver 20. Specifically, successively transmitted first and second ultra-sonic signals cause the control system 223 to directly tune the television receiver to a desired higher or lower channel, while the third and fourth ultra-sonic signals cause the control system 223 to increase or decrease the sound level of the receiver 20.

Referring now in greater detail to the FIG. 5, four-button embodiment, it differs primarily from the FIG. 1 embodiment in that it embodies a bi-directional motor 238, in contrast to the uni-directional motor used in the FIG. 1 embodiment. In this connection, the additional channel-down and volume-down resonator rods 270b and 272b, channel-down transistor 230b and volume-down transistor 232b, and channel relay 240b and volume relay 242b are used. It will appreciated that both the channel-up and down relays 240a and 240b effect the displacement of the actuator 250 (against the torsional resistance of spring 250A) but each relay energizes a different control circuit to produce a different directional rotation of the motor drive shaft 257. Similarly, the volume up and down relays 242a and 242b both effect the displacement of the actuator 252 (against the longitudinal resistance of spring 252A) and each energizes a different control winding 239a and 239b to control the directional rotation of the motor drive shaft 257. In this connection, separate holding circuits for the motor control windings 239a and 239b are employed and the cam follower 316 of the tuner programming arrangement 310 is modified, as shown in FIG. 5, and the cam follower 364 of the volume programming arrangement 340 is likewise modified, as shown in FIG. 5. To prevent the simultaneous energization of the motor control windings 239a and 239b by either of the cam followers 316 or 364, a suitable frictional cam 300 is mounted on the motor shaft 257 to open either one of the contacts 302 or 304 when the motor shaft 257 rotates in either a clockwise or a counterclockwise direction. By this arrangement, the motor control windings 239a and 239b never can be simultaneously energized by the holding circuits of the programming arrangements 310 or 340.

In view of the fact that the drive collar 275, drive pinion 258, actuators 250 and 252, rocker assembly 278, and input gears 260 and 262 are identical with the corresponding components of the FIG. 1 embodiment, a detailed description of their operation is not repeated.

While the embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A wireless remote control system operable by a plurality of energy signals radiating from remotely positioned transmitter means for controlling electrical circuit means including a plurality of control functions each having a plurality of operating conditions, said system comprising first responsive means responsive to a first one of said energy signals, prime mover means including output means, means adapted to establish a driving connection between said prime mover means and one of said control functions, said first responsive means being adapted to prepare said driving connection for operation and simultaneously to energize said prime mover means, said output means causing said driving connection to be operative, whereby the operative condition of one of said control functions is changed.

2. A wireless remote control system operable by energy signals radiating from remotely positioned transmitter means for controlling electrical circuit means including first and second control functions each having a plurality of operating conditions, said system comprising first responsive means responsive to a first one of said energy signals, prime mover means including output means, first and second actuator means cooperatively associated with said output means, first and second driving connection means adapted to interconnect said prime mover means and said first and second control functions respectively, rocker assembly means interconnecting said first driving connection means and said second driving connection means, said first responsive means being adapted to render said first actuator means inoperative and simultaneously energize said prime mover means to cause said output means to engage said second actuator means and operate said rocker assembly means to establish said first driving connection means for the purpose of changing the operative condition of said first control function.

3. A wireless remote control system for performing a plurality of control functions comprising signal initiating means corresponding to each of said functions, adjustment means for each of said functions, a prime mover, linkage means for drivingly connecting each of said adjustment means to said prime mover, and means responsive to each signal of said initiating means for selectively actuating the corresponding linkage means.

4. A wireless remote control system for performing a plurality of control functions comprising signal initiating means corresponding to each of said functions, adjustment means for each of said functions, a prime mover, linkage means for drivingly connecting each of said adjustment means to said prime mover, actuator means corresponding to each of said linkage means each having an operative condition and an inoperative condition, and conditioning means for each of said actuator means each responsive to at least one signal from said initiating means for determining which of said conditions the associated actuator means assumes, each of said actuator means when in the operative condition being adapted to effectuate the associated linkage means.

5. A wireless remote control system for performing a plurality of functions comprising signal initiating means corresponding to each of said functions, adjustment means for each of said functions, a prime mover, linkage means for drivingly connecting each of said adjustment means to said prime mover, actuator means corresponding to each of said linkage means each having an operable condition and an inoperable condition, conditioning means for each of said actuator means each responsive to at least one signal from said initiating means for determining which of said conditions the associated actuator means assumes, energizing means for said prime mover also responsive to said signal, each of said actuator means when operable being adapted to transmit motion from said prime mover when energized to the corresponding linkage means whereby said linkage means is actuated and adjustment of the associated control function is accomplished.

6. A wireless remote control system operable by a plurality of energy signals radiating from remotely positioned transmitter means for controlling electrical circuit means including a plurality of control functions each having a plurality of operating conditions, said system comprising first responsive means responsive to a first one of said energy signals, prime mover means including output means, means adapted to establish a first driving connection between said prime mover means and one of said control functions, said first responsive means being adapated to prepare said first driving connection for operation and simultaneously to energize said prime mover means, said output means causing said first driving connection to be operative, whereby the operative condition of one of said control functions is changed, and second driving connection means between said prime mover means and another of said control functions, said second driving connection means being rendered inoperative by said output means while said first driving connection is operative.

7. A wireless remote control ssytem for performing first and second control functions comprising first and second signal initiating means, first and second function adjusting means, prime mover means, first and second linkage means through which said prime mover means can drive said first and second adjusting means, first and second actuator means each having an operative and an inoperative condition, first and second conditioning means responsive to said first and second signals to determine which of said conditions said first and second actuator means assume, energizing means for said prime mover responsive to either of said first and second signals to cause an output movement in said prime mover, interlocking means between said first and second linkage means for assuring that only one of said linkage means is operable at a time, said output movement being transmitted through a selected one of said actuator means in its operative condition to render a selected one of said linkage means effective whereby said prime mover means can subsequently accomplish adjustment of a selected one of said control functions.

References Cited in the file of this patent

UNITED STATES PATENTS 1,591,417    Flocco _____ July 6, 1926